US012725082B2

(12) United States Patent
Kim et al.

(10) Patent No.: US 12,725,082 B2
(45) Date of Patent: Sep. 1, 2026

(54) MACHINE LEARNING MODEL METHOD AND SYSTEM FOR CROSS-DOMAIN RECOMMENDATIONS

(71) Applicant: Intuit Inc., Mountain View, CA (US)

(72) Inventors: Aleksandr Kim, Tel Aviv (IL); Yair Horesh, Tel Aviv (IL); Itay Margolin, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 484 days.

(21) Appl. No.: 18/525,670

(22) Filed: Nov. 30, 2023

(65) Prior Publication Data

US 2025/0181964 A1 Jun. 5, 2025

(51) Int. Cl.
*G06N 20/00* (2019.01)

(52) U.S. Cl.
CPC .................................... *G06N 20/00* (2019.01)

(58) Field of Classification Search
CPC ............................... G06N 20/00; G06N 3/045
USPC ........................................................... 706/12
See application file for complete search history.

(56) References Cited

U.S. PATENT DOCUMENTS

2021/0149671 A1* 5/2021 Sar Shalom ............. G06N 3/08
2025/0181964 A1* 6/2025 Kim ....................... G06N 3/045

OTHER PUBLICATIONS

Databricks staff, What is a vector database?, 2023 (Year: 2023).*

* cited by examiner

*Primary Examiner* — Tarek Elchanti
(74) *Attorney, Agent, or Firm* — Lathrop GPM LLP

(57) ABSTRACT

A method including receiving a domain vector including a first data structure describing a first domain with which a subject interacts. A multilabel classification model is applied to the domain vector to generate a classification prediction including a classification vector. The classification vector has a second data structure describing a likelihood that a second domain, which is different than the first domain, is related to the subject. The classification prediction is based on the first domain. An uplift model is applied to the classification vector to generate an uplift value. The uplift value represents a probability that the subject is positively associated with the second domain. A vectorization algorithm is applied to the subject, the second domain, and the uplift value to generate an uplift vector including a third data structure describing a triplet of the subject, the second domain, and the uplift value. The uplift vector is returned.

20 Claims, 7 Drawing Sheets

MACHINE LEARNING MODEL METHOD AND SYSTEM FOR CROSS-DOMAIN RECOMMENDATIONS

BACKGROUND

Machine learning models are computer executed algorithms that, when applied to data, identify patterns in the data and output predictions regarding the patterns, the data, or some other information of interest that is related to the data. Machine learning models may be trained on information in one or more domains (e.g., a product recommendation domain, a physics domain, a semantic domain, etc.) However, if the desired prediction is related to another domain that is not in the one or more domains upon which the machine learning model was trained, then the prediction may be undesirably inaccurate.

SUMMARY

One or more embodiments provide for a method. The method includes receiving a domain vector including a first data structure storing computer-readable data describing a first domain with which a subject interacts. The method also includes applying a multilabel classification model to the domain vector to generate a classification prediction including a classification vector. The classification vector has a second data structure storing computer-readable data describing a likelihood that a second domain, which is different than the first domain, is related to the subject. The classification prediction is based on the first domain. The method also includes applying an uplift model to the classification vector to generate an uplift value. The uplift value represents a probability that the subject is positively associated with the second domain. The method also includes applying a vectorization algorithm to the subject, the second domain, and the uplift value to generate an uplift vector including a third data structure storing computer-readable data describing a triplet of the subject, the second domain, and the uplift value. The method also includes returning the uplift vector.

One or more embodiments provide for another method. The method includes receiving known multi-domain vectors storing computer readable data that describe subjects. Each of the subjects interact with both a first domain and a second domain among second domains. Labels for the subjects, each including a sub-vector identifying at least one corresponding second domain of the second domains with which a corresponding subject in the subjects interacted. The method also includes training an untrained multilabel classification model by applying, iteratively until convergence, the untrained multilabel classification model to the known multi-domain vectors. Training generates a multilabel classification model. The method also includes receiving a domain vector including a first data structure storing computer-readable data describing the first domain with which a test subject interacts. The test subject is different than the subjects. The test subject fails to interact with the second domain. The method also includes applying the multilabel classification model to the domain vector to generate a classification prediction including a classification vector. The classification vector includes a second data structure storing computer-readable data describing a likelihood that the second domain is related to the subject. The method also includes applying an uplift model to the classification vector to generate an uplift value. The uplift value represents a probability that the subject is positively associated with the second domain. The method also includes applying a vectorization algorithm to the subject, the second domain, and the uplift value to generate an uplift vector including a third data structure storing computer-readable data describing a triplet of the subject, the second domain, and the uplift value. The method also includes returning the uplift vector.

One or more embodiments provide for a system. The system includes a computer processor and a data repository in communication with the computer processor. The data repository stores a domain vector including a first data structure storing computer-readable data describing a first domain with which a subject interacts. The data repository also stores a classification prediction including a classification vector. The classification vector includes a second data structure storing computer-readable data describing a likelihood that a second domain, which is different than the first domain, is related to the subject. The data repository also stores an uplift value representing a probability that the subject is positively associated with the second domain. The data repository also stores an uplift vector including a third data structure storing computer-readable data describing a triplet of the subject, the second domain, and the uplift value. The system also includes a multilabel classification model which, when applied the processor to the domain vector, generates the classification prediction. The system also includes an uplift model which, when applied by the processor to the classification vector, generates the uplift value. The system also includes a vectorization algorithm which, when applied by the processor to the subject, the second domain, and the uplift value, generates the uplift vector. The system also includes a server controller programmed, when executed by the processor, to receive the domain vector, coordinate applications of the multilabel classification model, the uplift model, and the vectorization algorithm, and return the uplift vector.

Other aspects of one or more embodiments will be apparent from the following description and the appended claims.

BRIEF DESCRIPTION OF DRAWINGS

Like elements in the various figures are denoted by like reference numerals for consistency.

DETAILED DESCRIPTION

One or more embodiments are directed to machine learning model methods for cross-domain recommendations. In particular, one or more embodiments are related to predicting how a subject may react to a second domain, when the only information available about the subject relates to a first domain that is related to the subject but different than the second domain.

Figure 3:
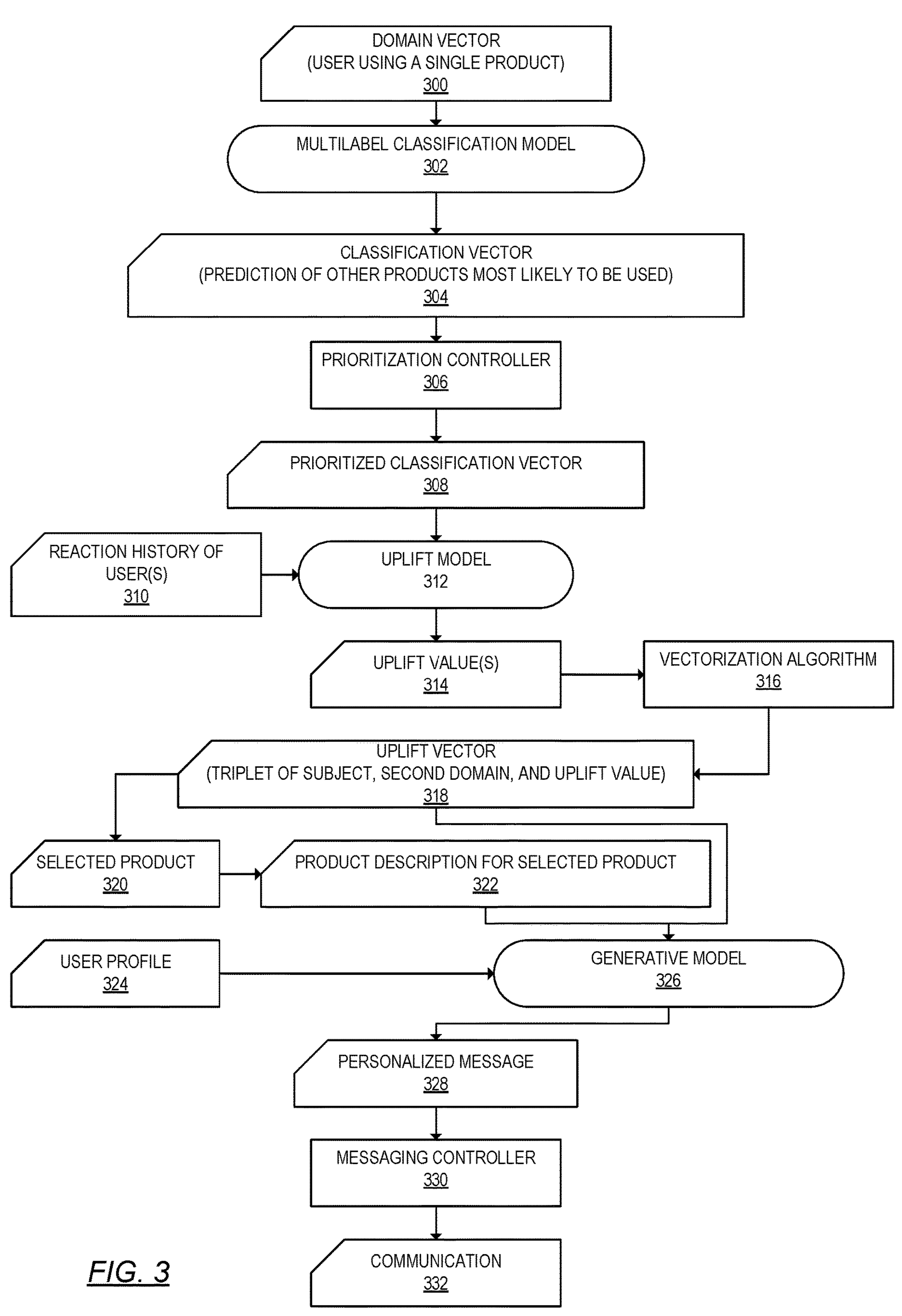
FIG. 3 shows an example of a data flow, in accordance with one or more embodiments.

For example, as shown with respect to FIG. 3, the subject may be a user. The user may use a first software application (i.e., the first domain). However, the user may benefit from a second software application (i.e. the second domain) which the user may know nothing about. In this case, one or more embodiments may be used to predict, using a combination of machine learning models, how the user may react to a message regarding the second software application.

As indicated above, simply applying a machine learning model to information about the subject and the first domain may not generate desirably accurate results. For example, if the machine learning model is trained on the first domain, then the machine learning model may perform poorly at predicting whether the subject will have a positive association with the second domain, because the machine learning model lacks a basis for evaluating the second domain. In another example, if the machine learning model is trained on the second domain, then the machine learning model may perform poorly at predicting whether the subject will have a positive association with the second domain, because the machine learning model lacks a basis for evaluating the first domain. Even if the machine learning model is trained on both domains, if the only input available to the machine learning model relates to the first domain, then the resulting prediction output by the machine learning model may be undesirably inaccurate.

One or more embodiments address the technical challenges identified above. In particular, one or more embodiments use a combination of a multilabel classification machine learning model and an uplift machine learning model to generate an uplift vector that describes a prediction regarding how the subject (for which information regarding the first domain is available) may be positively associated with a second domain.

The uplift vector may be applied in a variety of different manners. For example, the uplift vector may be supplied to another machine learning model or another computer executable algorithm that uses the uplift vector for some other computerized function. In another example, the uplift vector may be supplied, together with other information, to a generative model. The generative model may be used to generate a message which may be transmitted to the subject (as described with respect to the example of FIG. 3).

Regardless of the use to which the uplift vector may be applied, one or more embodiments provide for a method of generating a cross-recommendation. Specifically, the uplift vector described above (and further with respect to FIG. 1A) may be a prediction or recommendation regarding how a subject may be positively associated with a second domain, when information regarding the subject relates to a first domain.

Figure 1A:
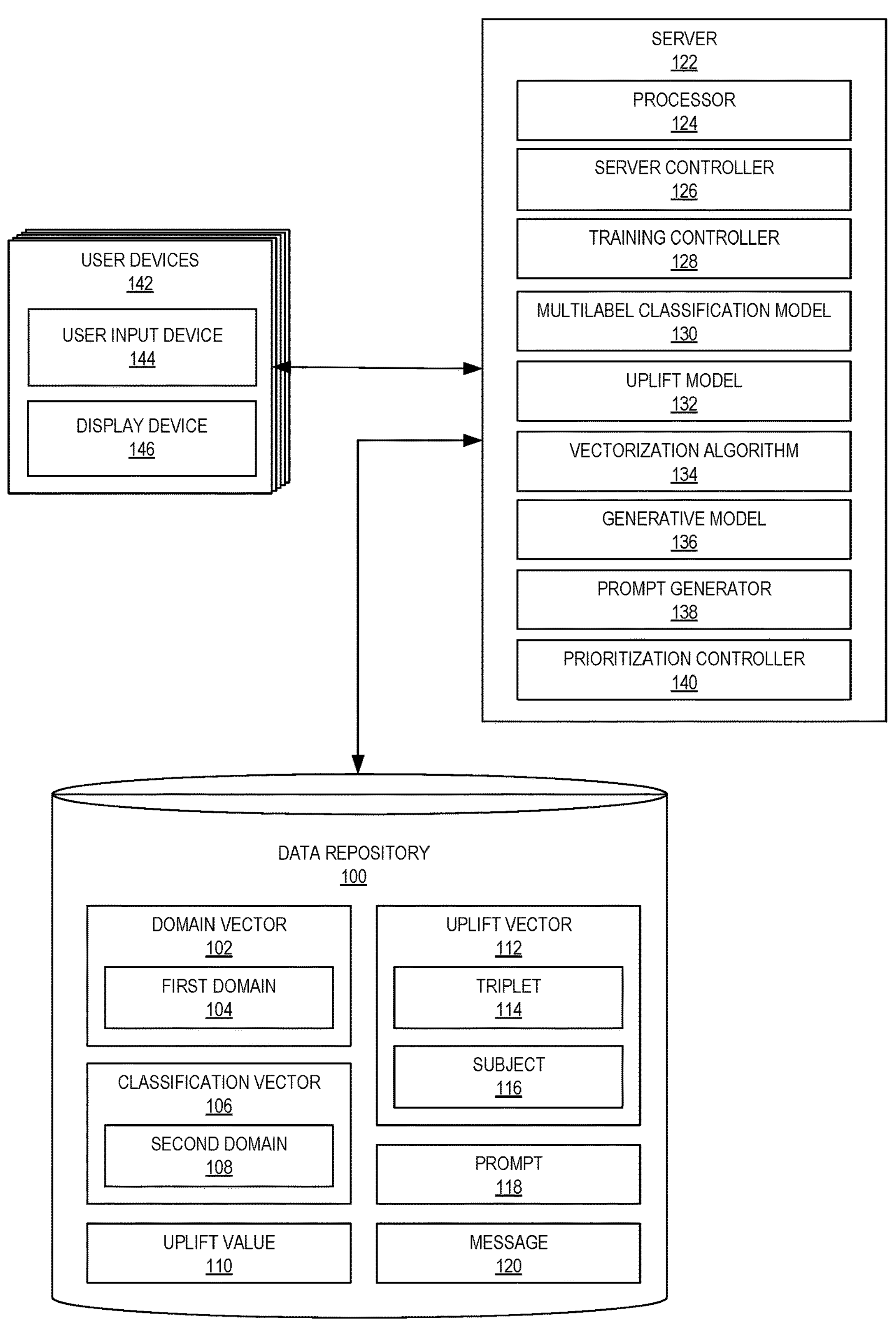
FIG. 1A and FIG. 1B shows a computing system, in accordance with one or more embodiments.

Attention is now turned to the figures. FIG. 1A shows a computing system, in accordance with one or more embodiments. The system shown in FIG. 1A includes a data repository (100). The data repository (100) is a type of storage unit or device (e.g., a file system, database, data structure, or any other storage mechanism) for storing data. The data repository (100) may include multiple different, potentially heterogeneous, storage units and/or devices.

The data repository (100) stores a domain vector (102). The domain vector (102) is a first data structure storing computer-readable data describing a first domain (104) with which a subject (116) interacts. The subject (116) is defined further below, but briefly, the subject is the target of interest in one or more embodiments. The first domain (104) is a data set composed of multiple individual datum that are within a pre-determined semantic distance of each other, as quantified by a semantic matching algorithm. The first domain (104) also may be considered a data set which a computer scientist or technician may label as being in the first domain (104).

An example of the first domain (104) may be data regarding a specific software application or use of the specific software application. An example of the subject (116) may be a user of the specific software application. These are examples are expanded with respect to FIG. 3.

The domain vector (102) is also a "vector" as that term is used with respect to machine learning model technology. Thus, the domain vector (102) is a data structure suitable for input to a machine learning model, and in particular is suitable for input to the multilabel classification model (130) described below. In an embodiment, a vector may be a "N" by "1" matrix, where "N" represents a number of features and where the values of the features are stored in the single row that forms the "1" dimensional matrix. However, a vector may also be a higher dimensional matrix, such as an "N" by "M" matrix, where "N" and "M" are numbers.

A feature is a type of information. For example, a feature may be the number of login attempts to a software application. The feature has a corresponding value, such as "5." Given sufficient features, and corresponding values, a desired amount of information may be stored in a vector.

The data repository (100) also may store a classification vector (106). The classification vector (106) is a vector, as defined above, that is output by the multilabel classification model (130) (defined below). More specifically, the classification vector (106) may be a second data structure storing computer-readable data describing a likelihood that a second domain (108), that is different than the first domain (104), is related to the subject (116). The classification prediction (expressed as the classification vector (106) is based on the first domain (104).

The second domain (108) is, like the first domain (104), is a data set composed of multiple individual datum that are within a pre-determined semantic distance of each other, as quantified by a semantic matching algorithm. The second domain (108) also may be considered a data set which a computer scientist or technician may label as being in the second domain (108). However, as used herein, the second domain (108) is different than the first domain (104). In other words, the first domain (104) and the second domain (108) are not within the pre-determined semantic distance of each other or are otherwise pre-defined by a computer scientist or technician as being in different domains.

As defined above, the classification vector (106) stores data describing a likelihood that the second domain (108) is related to the subject (116). The second domain (108) is related to the subject (116) when the multilabel classification model (130) quantitatively predicts that there may exist a possible connection between the second domain (108) and the subject (116).

Continuing the example above, the subject is a user, and the first domain is a first software application. In this case, the second domain may be a second software application with which the user has not interacted. In this case, the classification vector (106) may be a quantitative prediction (the classification prediction) that the user may be interested in (or have a connection to or otherwise is related to) the second software application. That prediction is generated by the multilabel classification model (130) (defined below) being applied to the domain vector (102).

The data repository (100) also may store an uplift value (110). The uplift value (110) is a number that represents a probability that the subject is positively associated with the second domain. The determination of the positive association may be quantitatively predicted by an uplift model (132), defined below, or may be made by a computer scientist or technician. The term "positive association" refers to a quantitatively measurable affinity between the second domain and the subject. The uplift value (110) is determined by the uplift model (132).

Continuing the above example, assume that the user (subject) of the first software application (first domain) is predicted to be related to the second software application (second domain). In this case, the positive association may be a predicted probability that the user will be interested in the second software application (i.e., that the subject is positively associated with the second domain).

The data repository (100) also may store an uplift vector (112). The uplift vector (112) is a vector that forms a third data structure storing computer-readable data describing a triplet of the subject (116), the second domain (108), and the uplift value (110). A triplet is a set of data that may be treated as being connected or related to each other. The uplift vector (112) is generated by a vectorization algorithm (134), defined below.

The subject (116) is now defined. The subject (116) is the entity or data for which it is desired to predict whether the second domain (108) may be related. Again, because the available information regarding the subject (116) relates to the first domain (104), it is not straightforward to apply a single machine learning model to information regarding the subject (116) and the first domain (104), and then accurately predict whether a relationship may exist between the subject (116) and the second domain (108). The method of FIG. 2A may be used to perform such a cross-domain prediction.

Note that the examples provided above, and the example of FIG. 3, are in the context of a user (subject) of a first software application (first domain) possibly being related to or interested in a second software application (second domain). However, one or more embodiments described herein may be applicable in many different applications. For example, the subject could be a user, the first domain a first function of a single software application, and the second domain a second function of the single software application. In yet another example, the subject could be a first molecule used in a chemical reaction process, the first domain could be a second molecule used in a chemical reaction process, and the second domain could be a third molecule for which a chemist is interested in determining may interact with the first molecule.

Thus, one or more embodiments are not limited to connecting users to software or generating messages (as in the example of FIG. 3). Rather, one or more embodiments provide a process for cross-domain predictions when information is only available for one of two or more domains.

Returning to FIG. 1A, the data repository (100) also may store a prompt (118). The prompt (118) is an input to which a large language model (a type of the generative model (136) defined below) may be applied. The prompt (118) is expressed as text, including numbers.

The data repository (100) also may store a message (120). The message (120) is text, images, audio files, etc., which may be transmitted to a user device (e.g., one or more of the user devices (142)).

The system shown in FIG. 1A also may include other components. For example, the system shown in FIG. 1A also may include a server (122). The server (122) is one or more computing systems, possibly operating in a distributed computing environment. An example of the server (122) may be the computing system (500) shown in FIG. 5A.

The server (122) includes a processor (124). The processor (124) is one or more hardware or virtual processors which may execute one or more controllers, software applications, or models as described herein. The processor (124) may be the computer processor(s) (502) in FIG. 5A.

The server (122) may host a server controller (126). The server controller (126) is software or application specific hardware that, when executed by the processor, performs one or more operations described with respect to the method of FIG. 2A, the method of FIG. 2B, or the data flow shown in FIG. 3. The server controller (126) also may coordinate applications of the multilabel classification model, the uplift model, and the vectorization algorithm. For example, the server controller (126) may control the data flow shown in FIG. 3.

The server (122) also may host a training controller (128). The training controller (128) is software or application specific hardware that, when executed by the processor, may train a machine learning model. Details of the training controller (128) are described with respect to FIG. 1B.

The server (122) also may host a multilabel classification model (130). The multilabel classification model (130) is a machine learning model trained to perform a predictive modeling task that involves zero or more mutually non-exclusive class labels. Formally, multi-label classification may be described as the problem of finding a model that maps inputs "x" to binary vectors "y;" that is, the multilabel classification model (130) assigns a value of 0 or 1 for each element (label) in binary vectors "y." The multilabel classification model (130) may be, for example, a neural network configured for multi-label classification tasks. The multilabel classification model (130) also may be a K-nearest neighbor model, a decision tree model, a random forest model, and others.

The server (122) also may host an uplift model (132). The uplift model (132) is a machine learning model that models the incremental impact of a treatment (e.g., a marketing message) on the behavior of a subject (e.g., a consumer). The uplift model (132) determines an uplift, "U," as being the probability of the treatment less the probability of no treatment based on data received from some subjects that were treated and a control group of control subjects that were not treated. The uplift model (132) may be one or more of a tree-based algorithm, a neural network, a logistic regression model, a support vector machines, or some other types of machine learning models.

The server (122) also may host a vectorization algorithm (134). The vectorization algorithm (134) is software or application specific hardware which, when executed by the processor (124), transforms data stored in one data structure into a vector data structure. The vectorization algorithm (134) may collect data from disparate data sources. Thus, the vectorization algorithm (134), in the one or more embodiments, may generate the uplift vector (112) from the subject (116), the second domain (108), and the uplift value (110).

The server (122) also may host a generative model (136). A generative model transforms text from one form to another. For example, a type of generative model may be a large language model. The large language model takes text as input and transforms the input into an output. The large language model may summarize (the output) a large corpus of text (the input).

The generative model (136) is one or more machine learning models that may be used to generate new data instances. More formally, a generative model captures the joint probability of some output if there are no labels. A generative model includes the distribution of the data itself and may predict the likelihood of an example. For example, models that predict the next word in a sequence are typically generative models because such models can assign a probability to a sequence of words. Examples models that may be used as the generative model (136) may be a generative adversarial network (GAN), a variational autoencoder (VAE), an autoregressive model, a large language model, and others.

The server (122) also may host a prompt generator (138). The prompt generator (138) is software or application specific hardware which, when executed by the server (122), may generate the prompt (118) for a large language model (i.e., a specific type of the generative model (136)). The prompt generator (138) may gather data of interest and combine the data together with an instruction and possibly a system message. The prompt generator (138) instructs a large language model how to treat the data of interest when generating the output of the large language model.

The server (122) also may host a prioritization controller (140). The prioritization controller (140) is software or application specific hardware which, when executed by the processor (124), prioritizes information in the classification vector (106). For example, the classification vector (106) may include predictions for more than one domain that is different than the first domain (104).

For example, one or more embodiments contemplate that there may be, in addition to the second domain (108), a third domain, a fourth domain, a fifth domain, etc. The multilabel classification model (130) may generate the classification vector (106) for each of the domains (other than the first domain (104)). In this case, the prioritization controller (140) may organize the vectors, such as by first listing the other domain that is predicted to be most related to the subject (116).

The system shown in FIG. 1A also may include, or if not include then be in communication with, one or more user devices (142). The user devices (142) are computing systems, such as possibly the computing system (500) in FIG. 5A. The user devices (142) are used by users (e.g. consumers, customers, or perhaps computer scientists or technicians that interact with the server (122)). Note that in some embodiments one or more of the users may be the subject (116).

The user devices (142) may include one or more user input devices, such as the user input device (144). The user input devices are keyboards, mice, microphones, cameras, etc. with which a user may provide input to the user devices (142).

The user devices (142) may include one or more display devices, such as the display device (146). The display devices are monitors, televisions, touchscreens, etc. which may display information to a user.

Figure 1B:
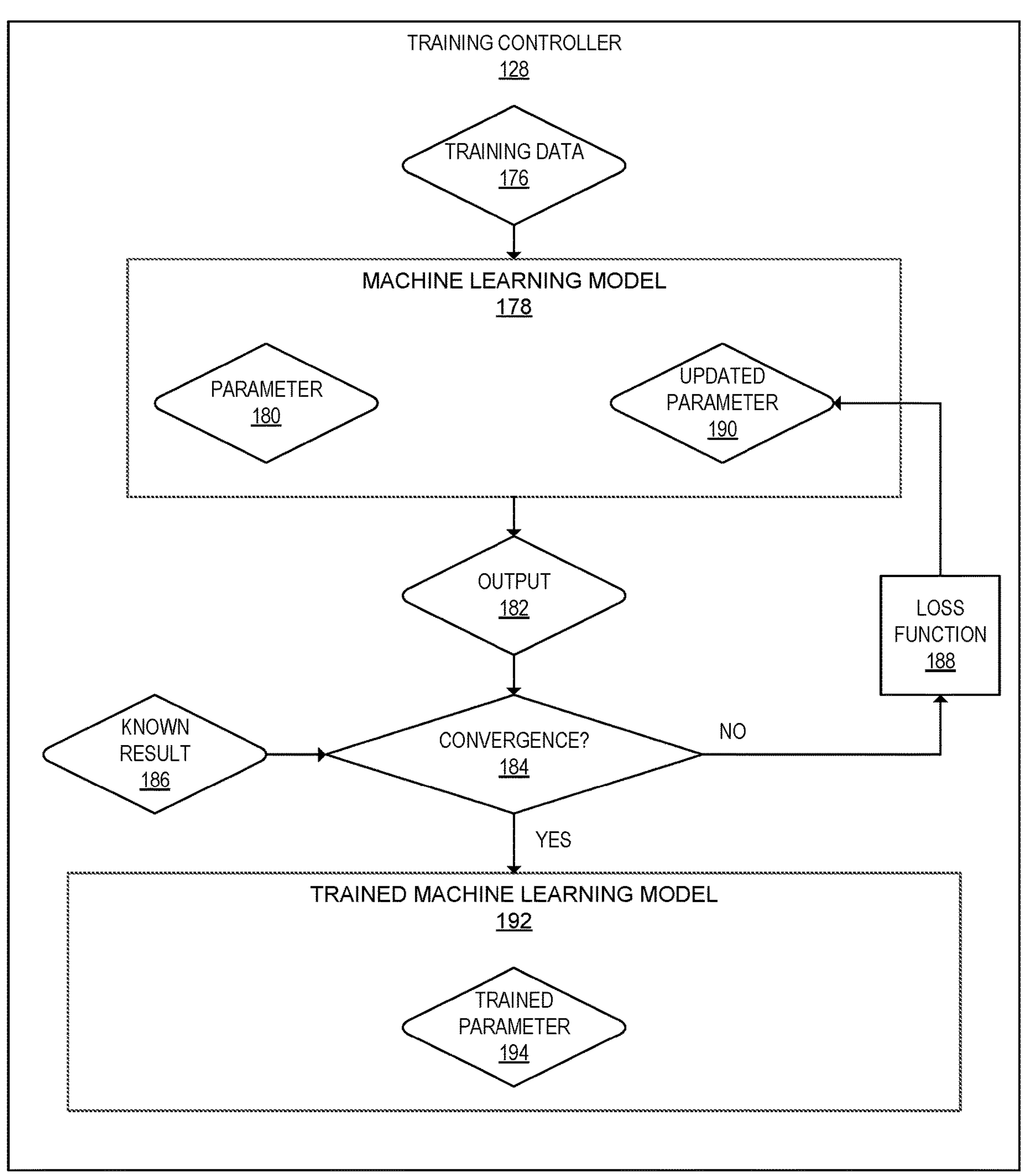

Attention is turned to FIG. 1B, which shows the details of the training controller (128). The training controller (128) is a training algorithm, implemented as software or application specific hardware, which may be used to train one or more the machine learning models described with respect to the computing system of FIG. 1A.

In general, machine learning models are trained prior to being deployed. The process of training a model, briefly, involves iteratively testing a model against test data for which the final result is known, comparing the test results against the known result, and using the comparison to adjust the model. The process is repeated until the results do not improve more than some predetermined amount, or until some other termination condition occurs. After training, the final adjusted model is applied to the training data (e.g., the training data (176)) in order to make predictions.

In more detail, training starts with training data (176). The training data (176) is data for which the final result is known with certainty. For example, if the machine learning task is to identify whether two names refer to the same entity, then the training data (176) may be name pairs for which it is already known whether any given name pair refers to the same entity.

The training data (176) is provided as input to the machine learning model (178). The machine learning model (178), as described before, is an algorithm. However, the output of the algorithm may be changed by changing one or more parameters of the algorithm, such as the parameter (180) of the machine learning model (178). The parameter (180) may be one or more weights, the application of a sigmoid function, a hyperparameter, or possibly many different variations that may be used to adjust the output of the function of the machine learning model (178).

One or more initial values are set for the parameter (180). The machine learning model (178) is then executed on the training data (176). The result is an output (182), which is a prediction, a classification, a value, or some other output which the machine learning model (178) has been programmed to output.

The output (182) is provided to a convergence process (184). The convergence process (184) is programmed to achieve convergence during the training process. Convergence is a state of the training process, described below, in which a pre-determined end condition of training has been reached. The pre-determined end condition may vary based on the type of machine learning model being used (supervised versus unsupervised machine learning) or may be pre-determined by a user (e.g., convergence occurs after a set number of training iterations, described below).

In the case of supervised machine learning, the convergence process (184) compares the output (182) to a known result (186). The known result (186) is stored in the form of labels for the training data. For example, the known result for a particular entry in an output vector of the machine learning model may be a known value, and that known value is a label that is associated with the training data.

A determination is made whether the output (182) matches the known result (186) to a pre-determined degree. The pre-determined degree may be an exact match, a match to within a pre-specified percentage, or some other metric for evaluating how closely the output (182) matches the known result (186). Convergence occurs when the known result (186) matches the output (182) to within the pre-determined degree.

In the case of unsupervised machine learning, the convergence process (184) may be compared to the output (182) to a prior output in order to determine a degree to which the current output changed relative to the immediately prior output or to the original output. Once the degree of changes fails to satisfy a threshold degree of change, then the machine learning model may be considered to have achieved convergence. Alternatively, an unsupervised model may determine pseudo labels to be applied to the training data and then achieve convergence as described above for a supervised machine learning model. Other machine learning training processes exist, but the result of the training process may be convergence.

If convergence has not occurred (a "no" at the convergence process (184)), then a loss function (188) is generated. The loss function (188) is a program which adjusts the parameter (180) (one or more weights, settings, etc.) in order to generate an updated parameter (190). The basis for performing the adjustment is defined by the program that makes up the loss function (188), but may be a scheme which attempts to guess how the parameter (180) may be changed so that the next execution of the machine learning model (178) using the training data (176) with the updated parameter (190) will have an output (182) that is more likely to result in convergence. (E.g., that the next execution of the machine learning model (178) is more likely to match the known result (186) (supervised learning), or which is more likely to result in an output that more closely approximates the prior output (one unsupervised learning technique), or which otherwise is more likely to result in convergence.)

In any case, the loss function (188) is used to specify the updated parameter (190). As indicated, the machine learning model (178) is executed again on the training data (176), this time with the updated parameter (190). The process of execution of the machine learning model (178), execution of the convergence process (184), and the execution of the loss function (188) continues to iterate until convergence.

Upon convergence (a "yes" result at the convergence process (184)), the machine learning model (178) is deemed to be a trained machine learning model (192). The trained machine learning model (192) has a final parameter, represented by the trained parameter (194). Again, the trained parameter (194) shown in FIG. 1B may be multiple parameters, weights, settings, etc.

During deployment, the trained machine learning model (192) with the trained parameter (194) is executed again, but this time on unknown data (i.e. data for which the final result is not known). The output of the trained machine learning model (192) is then treated as a prediction of the information of interest relative to the unknown data.

While FIG. 1A and FIG. 1B show a configuration of components, other configurations may be used without departing from the scope of one or more embodiments. For example, various components may be combined to create a single component. As another example, the functionality performed by a single component may be performed by two or more components.

Figure 2A:
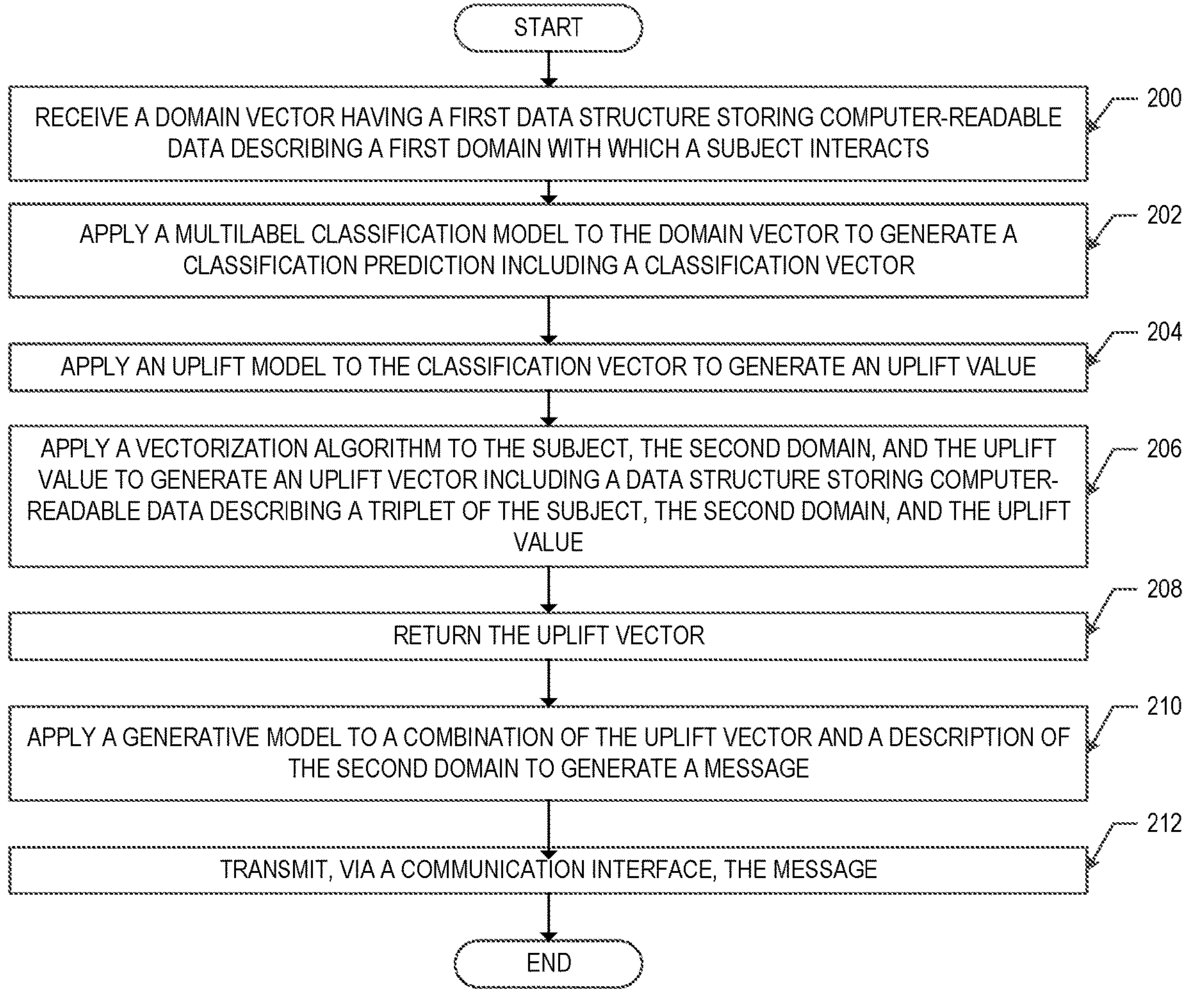
FIG. 2A and FIG. 2B show flowcharts of a method for machine learning model cross-domain recommendations, in accordance with one or more embodiments.
Figure 2B:
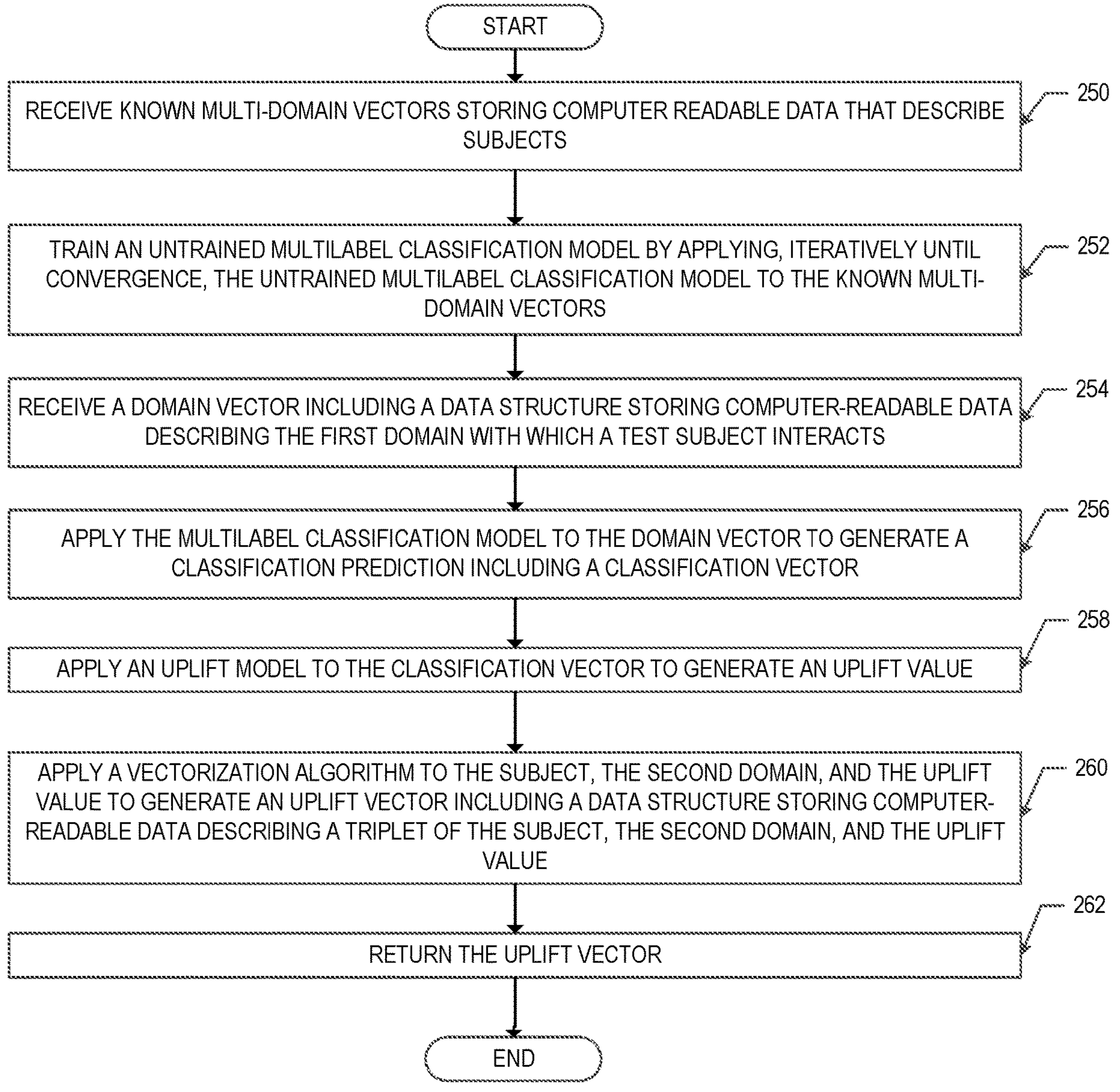

FIG. 2A and FIG. 2B show flowcharts of methods related to using machine learning models for cross-domain recommendations, in accordance with one or more embodiments. The methods of FIG. 2A and FIG. 2B may be performed using the system of FIG. 1A, possibly in view of the training controller (128) shown in FIG. 1B. The methods of FIG. 2A and FIG. 2B may be executed using the computer processor(s) (502) of the computing system (500) shown in FIG. 5A.

Attention is first turned to FIG. 2A. Step 200 includes receiving a domain vector having a data structure storing computer-readable data describing a first domain with which a subject interacts. The domain vector may be received by gathering or otherwise accessing data in the first domain that is related to the subject. For example, the processor may retrieve, or receive the domain vector from a data repository.

Step 202 includes applying a multilabel classification model to the domain vector to generate a classification prediction including a classification vector. The classification vector has a data structure storing computer-readable data describing a likelihood that a second domain, which is different than the first domain, is related to the subject. The classification prediction is based on the first domain.

Applying the multilabel classification model may be performed by the processor applying the multilabel classification model to a processor, which administers the domain vector as input to the multilabel classification model. The precise operations of the multilabel classification model during execution depend on the type of machine learning model used for the multilabel classification model. For example, in the case of a neural network, the domain vector may pass through a number of hidden layers in the neural network, with each hidden layer applying one or more parameters or weights which adjust the executed operations of each of the hidden layers.

In an embodiment, the classification vector output by the multilabel classification model may be further processed. For example, a prioritization controller may be applied by a processor to the output classification vector. The output of the prioritization controller is a list of vectors sorted in order of priority of the most likely association between the subject and one of a number of different domains. The resulting prioritized classification vector may then be processed as in step 204.

Step 204 includes applying an uplift model to the classification vector to generate an uplift value. The uplift value represents a probability that the subject is positively associated with the second domain. The uplift model may be applied by a processor to the classification vector. The uplift model takes the classification vector as input. In an embodiment, the uplift model also may take a reaction history of different subjects (other than the subject in question) as a further input. In an embodiment, the uplift model also may take a reaction history of the subject in question as a further input (whether or not such reaction history is related to the domain in question), if such a reaction history is available. The output of the uplift model is one or more uplift values.

The operation of the uplift model itself depends on the type of machine learning model used to implement the uplift model. For example, if the uplift model is a regression model, then one or more layer of the regression model may perform a logistic regression on the input, as modified by one or more weights or parameters.

Step 206 includes applying a vectorization algorithm to the subject, the second domain, and the uplift value to generate an uplift vector having a data structure storing computer-readable data describing a triplet of the subject, the second domain, and the uplift value. The vectorization algorithm may be applied by a processor to the uplift value, together with other information such as the subject and the second domain. The output of the vectorization algorithm is an uplift vector, which may be a triplet of the subject, the second domain, and the uplift value. For example, the vector may be a 3 by 1 vector, where the three features are "subject," "domain," and "uplift value," with corresponding values indicating identities of the corresponding features. The vectorization algorithm may function as a data structure transformer, which extracts data from one or more different data structures and inputs the data into the desired data structure (here, the uplift vector).

Step 208 includes returning the uplift vector. The processor may return the uplift vector by performing a number of different actions. For example, the uplift vector may be returned by storing the uplift vector in a data repository. The uplift vector may be returned by transmitting the uplift vector to some other process, such as by processing a generative model as described below in step 210. The uplift vector may be displayed to a user. The uplift vector may be transformed into an image in a graphical user interface, such as for example a pie chart, a bar graph, etc. The processor may perform other actions to return the uplift vector.

In an embodiment, the method of FIG. 2A may end at step 208 when the uplift vector is returned. However, the method also may continue. For example, step 210 includes applying a generative model to a combination of the uplift vector and a description of the second domain to generate a message. The generative model may be applied by a processor to the uplift vector and the description of the second domain. The uplift vector and the description may be input, though other information could also be combined as an input to the generative model. For example, when the generative model is a large language model, other information may be combined into a prompt to the large language model. The other information may include an instruction, a system message, examples, historical data, and other information.

The exact operation of the generative model depends on the type of the generative model. For example, when the generative model is a large language model, then a prompt generator may combine the uplift vector, the description of the second domain, past history information, examples, instructions, and a system message into a prompt. The large language model is then applied by the processor to the prompt to generate a message. However, other operations of generative models are envisioned, depending on the generative model selected.

Step 212 includes transmitting, via a communication interface, the message. The message may be transmitted by the processor via a communication interface via a network. The message may be transmitted via email, as a direct message supplied to an application being used by the subject, via a social media post, via a private message, via a text message, etc.

The method of FIG. 2A may be varied. For example, the method of FIG. 2A may include one or more training steps to train one or more of the models used in the method of FIG. 2A.

Thus, for example, the method of FIG. 2A also may include training an untrained multilabel classification model. Training in this case may be performed by applying, iteratively until convergence, the untrained multilabel classification model to known multi-domain vectors. Each of the known multi-domain vectors store computer readable data that describes multiple subjects, other than the subject, which interact with both the first domain and the second domain. In this case, training generates the multilabel classification model.

For example, assume that the subject is a user, the first domain is a first application used by the user, and the second domain is some other application not currently used by the user. The multi-domain vectors may represent information collected about other users who do use at least two application (i.e., both the first application and the second application). In other words, the multilabel classification vector is trained using data from users (subjects) that use at least two software applications (both domains).

In another embodiment, the method of FIG. 2A also may include training an untrained uplift model by applying, iteratively until convergence, the untrained uplift model to reaction histories of multiple users to past messages. Training generates the uplift model. Training the untrained uplift model may be performed together with training the multilabel classification vector, whether serially or in parallel, Continuing the above example, a reaction history was stored after implementing a prior advertising campaign to convince users (subjects) of a first software application (first domain) to use a second software application (second domain). It is known which users responded positively, which did not respond, user identities, the wording of messages sent out to the users, etc. The resulting reaction history may be used as the training data during the training of the uplift model.

In another embodiment, the method of FIG. 2A also may include training an untrained generative model. Training may include applying, iteratively until convergence, the untrained generative model to a combination of descriptions of examples of the second domain and past messages related to the second domain. Training generates a generative model programmed to output a message when the generative model is applied a combination of the uplift vector and a description of the second domain.

Continuing the above example, the messages sent to the subjects of the past advertising campaign, and the reactions of the subjects, may have been saved. The past messages, and the reactions, then may be used along to train the generative model to improve the output of the generative model to a current advertising campaign to be directed towards the users of the first software application. The training data may be enhanced by past user profiles, product descriptions, and other information.

The method of FIG. 2A also may include monitoring the results of the method of FIG. 2A and then updating the training of the various models or the data used as input to the models accordingly. For example, the method also may include applying a generative model to a combination of the uplift vector and a description of the second domain to generate a message. Then the method includes transmitting, via a communication interface, the message. The method then includes receiving a feedback regarding a behavior of first subject in response to the message. The method then also includes retraining, iteratively until convergence, at least one of the multilabel classification model, the uplift model, and the generative model using the feedback. Still other variations are possible.

Attention is now turned to the method of FIG. 2B. The method of FIG. 2B is a variation of the method of FIG. 2A. However, the method of FIG. 2B includes training steps.

Step 250 includes receiving known multi-domain vectors storing computer readable data that describe multiple subjects. Each of the subjects interact with both a first domain and a second domain selected from among possibly many instances of second domains. It is possible that a subject may interact with a single domain and another subject may interact with multiple ones of the instances of the second domains. Indeed, because one subject may interact with different second domains, the label for a subject may be a vector identifying the second domains with which the subject interacted, and not necessarily only a single number identifying an identifier of a second domain. The multi-domain vectors may be received by retrieving the data from a data repository, or by one or more software applications gathering and collating the desired data.

Step 252 includes training an untrained multilabel classification model by applying, iteratively until convergence, the untrained multilabel classification model to the known multi-domain vectors. Training generates a multilabel classification model. Training may proceed as described above with respect to one of the extensions of FIG. 2A. Note that a multilabel model is selected, as opposed to a multiclass model, because one subject can interact with different instances of multiple second domains.

Step 254 includes receiving a domain vector having a first data structure storing computer-readable data describing the first domain with which a test subject interacts. The test subject is different than the subjects. The test subject fails to interact with the second domain.

Receiving the domain vector may be performed as described with respect to step 200 of FIG. 2A.

Step 256 includes applying the multilabel classification model to the domain vector to generate a classification prediction including a classification vector. The classification vector has a second data structure storing computer-readable data describing a likelihood that the second domain is related to the subject. Step 256 may be performed as described with respect to step 204 of FIG. 2A.

Step 258 includes applying an uplift model to the classification vector to generate an uplift value. The uplift value represents a probability that the subject is positively associated with the second domain. Step 258 may be performed as described with respect to step 206 of FIG. 2A.

Step 260 includes applying a vectorization algorithm to the subject, the second domain, and the uplift value to generate an uplift vector having a data structure storing computer-readable data describing a triplet of the subject, the second domain, and the uplift value. Step 260 may be performed as described with respect to step 206 of FIG. 2A.

Step 262 includes returning the uplift vector. Step 262 may be performed as described with respect to step 208 of FIG. 2A.

The method of FIG. 2B may be varied. For example, one or more of the other training steps described with respect to FIG. 2A also may be applied to the method of FIG. 2B. Similarly, the method of FIG. 2B also may include applying a generative model to a combination of the uplift vector, a user profile, and a description of the second domain to generate a message, as described with respect to the method of FIG. 2A. The method of FIG. 2B then may include transmitting, via a communication interface, the message, as described with respect to the method of FIG. 2A.

While the various steps in the flowcharts of FIG. 2A and FIG. 2B are presented and described sequentially, at least some of the steps may be executed in different orders, may be combined or omitted, and at least some of the steps may be executed in parallel. Furthermore, the steps may be performed actively or passively.

FIG. 3 shows an example of a data flow, in accordance with one or more embodiments. The data flow of FIG. 3 in particular shows an example of a machine learning model method for cross-domain recommendations, in accordance with one or more embodiments. The following example is for explanatory purposes only and not intended to limit the scope of one or more embodiments.

In particular, the example is in the context of attempting to determine which users of a first software application may be interested in using a second software application that is related to the first software application. In a specific example, the first software application is a business finance software application for tracking business finances, and the second software application is tax preparation software which may use the information stored in the business finance software application. Thus, the second software application is related to the first software application in that one may draw on the data stored in the other in order to provide additional functionality that may be of interested to the user. In this specific example, the user of the first software application is the subject, the business finance software application is the first domain, and the tax preparation software is the second domain.

Again, however, the example does not limit one or more embodiments described with respect to FIG. 1A through FIG. 2B. A similar data flow may be applied to scientific research, medicine, law enforcement, etc. to perform a variety of cross-domain predictions.

In FIG. 3, the shapes of the outlines convey meaning. Clipped boxes represent data structures storing the indicated information. Rounded boxes represent machine learning models as indicated. Square boxes represent algorithms or processes expressed in computer readable program code, but which is not necessarily machine learning models.

The data flow of FIG. 3 begins with a domain vector (300) which describes a user who uses a single product (the business finance application). The domain vector (300) may store usage history of the use to which the user puts the single product, login information, a user profile, the user's financial data, and possibly other information.

Then, a multilabel classification model (302) is applied to the domain vector (300). The output of the multilabel classification model (302) is a classification vector (304). The classification vector (304) is a prediction of other software products, related to the business finance application, which are most likely to be used by the user. The classification vector (304) may be multiple vectors or may be a single vector with many features where each feature represents a different product other than the single product. In the example, ten software products may be available, and the classification vector (304) generates a prediction that the user will be interested in each of the ten software products. The ten software products are related, at least tangentially, to the business finance software. One of the ten software products is the tax preparation software mentioned above.

The classification vector (304) is provided to a prioritization controller (306). The prioritization controller (306) prioritizes the various products in the classification vector (304) to generate a prioritized classification vector (308). The prioritized classification vector (308) prioritizes the ten software products in descending order of probability that the user will be interested in a corresponding software product. Thus, of the ten software products, the software application which has the highest predicted likelihood of interesting the user is presented first.

The prioritized classification vector (308) is provided, along with a reaction history of other user(s) (310), to an uplift model (312). The reaction histories may be of different users, the specific user of interest (i.e., the subject) or combinations thereof). The reaction histories may be user reactions to past advertising campaigns or past attempts to convince the reaction history of other user(s) (310) to use one or more of the ten products in the prioritized classification vector (308). The combination of the prioritized classification vector (308) and the reaction history of other user(s) (310) may be combined into a vector data structure that is input to the uplift model (312).

The output of the uplift model (312) is one or more uplift value(s) (314). One uplift value is associated with each of the ten software applications (second domains) other the software application (first domain) that the user (subject) is currently using.

The uplift value(s) (314) is provided to a vectorization algorithm (316). The vectorization algorithm (316) also takes, as input, information about the user (the subject), and each of the ten software applications (second domains).

The output of the vectorization algorithm (316) is an uplift vector (318). The uplift vector (318) may be multiple vectors, with each vector representing a triplet of the user (subject), the corresponding second domain (i.e., one of the ten software applications), and the corresponding uplift value associated with the corresponding second domain.

In the example of FIG. 3, the second domain (one of the ten software applications) having the highest uplift value is selected for presentation to the subject (user). Specifically, the tax preparation software has the highest uplift value. The tax preparation software is the selected product (320) for which a message will be generated for the subject.

The process continues by the processor gathering a product description for the selected product (322). The product description for the selected product (322) may be advertising material for the tax preparation software, a description of the functions or capabilities of the tax preparation software, a description of how the tax preparation software can interact with and use the information in the currently used business finance software, etc.

The uplift vector (318), the product description for the selected product (322), and a user profile (324) of the user may be provided to a generative model (326). Other information could also be provided to the generative model (326). For example, if the generative model (326) is a large language model, then the input to the generative model (326) also may include a system message, a command, and past example messages, and possibly other information. The information is then all combined into a prompt that is input to the large language model. The prompts may be based on pre-generated prompts. However, if the generative model (326) is an image generation model, then the input may be one or more images associated with the tax preparation software.

The generative model (326) may be a combination of different models which perform different functions. For example, a large language model may be used to generate a message and an image generation model may be used to generate an image. The image and the message may then be combined and formatted using a third generative model.

In any case, the output of the generative model (326) is a personalized message (328). The personalized message (328) is personalized to the user. For example, not only is the user addressed by name, but the message may contain information regarding the capabilities of the tax preparation software that directly interact with the functions and data used by the user with respect to the business finance software. Thus, the user may be presented, automatically, with specific benefits that might accrue to the user if the user were to purchase one or more functions of the tax preparation software.

The personalized message (328) is provided to a messaging controller (330). The messaging controller (330) may generate the actual message to be transmitted. For example, the messaging controller (330) may be an email program that generates an email to send to the user. The messaging controller (330) may be a function of the business finance software that may present the personalized message (328) to the user. The messaging controller (330) may be a text or instant message program for sending the personalized message (328) via text or instant message.

In any case, the messaging controller (330) transmits a communication (332) to the user. The user may then review the personalized message (328), and act accordingly as the user desires.

Figure 4:
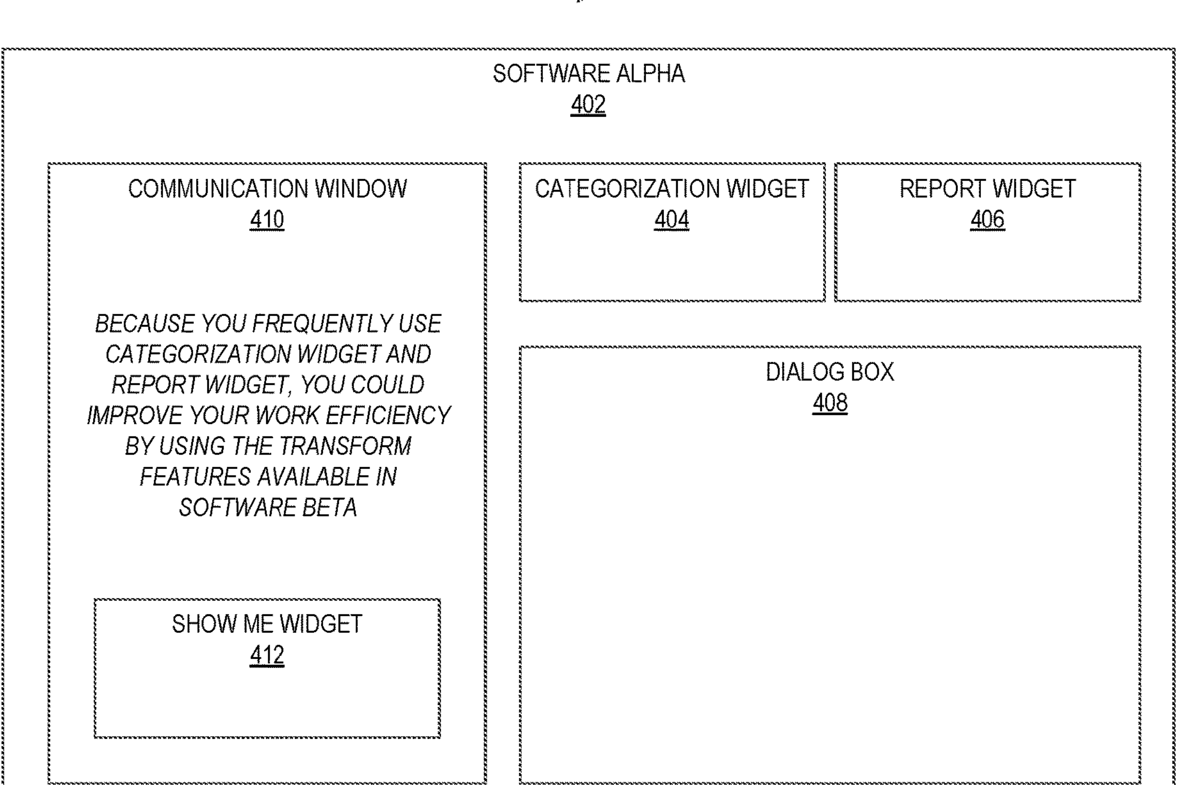
FIG. 4 shows an example user interface generated after applying the data flow shown in FIG. 3, in accordance with one or more embodiments.

Attention is now turned to FIG. 4. FIG. 4 shows an example user interface generated after applying the data flow shown in FIG. 3, in accordance with one or more embodiments. The user interface (400) is generated by software alpha (402), which is a business finance software application in this example. The software alpha (402) is used by a user, Able Baker, to help track the finances of Able Baker's business.

In the course of using the software alpha (402), Able Baker frequently interacts with two widgets: a categorization widget (404) and a report widget (406). The categorization widget (404) assists Able Baker with categorizing various business transactions. The report widget (406) assists Able Backer with generating financial reports, such as income and expense reports. A dialog box (408) may display information to Able Baker, such as categorization information, reports, and any other information or functions provided by the software alpha (402).

In addition, the software alpha (402) includes a communication window (410). The communication window (410) shows messages, such as a system message, or perhaps the communication (332) generated by the data flow shown in FIG. 3.

In the example, the data flow of FIG. 4 has been applied. Able Baker is the subject. The software alpha (402) is the first domain. It is determined that Able Baker may be most interested in Software Beta, a tax preparation software, because Software Beta can take advantage of the categorization performed by the categorization widget (404) and in part because of the kinds of reports that Able Baker generates using the report widget (406). The combination of the multilabel classification model and the uplift model may also consider other information, such as Able Baker's user profile, the behavior of other users, marketing campaigns for Software Beta sent to Able Baker or other users, and many other information.

Ultimately, the message generated for Able Baker is shown in the communication window (410). Thus, Able Baker is able to consider whether Software Beta might be of use. If desirable, a show me widget (412) may be provided as part of the message in the communication window (410). The show me widget (412) may be a link which will demonstrate how Software Beta can take advantage of the functionality of the software alpha (402), or data used by the software alpha (402), to improve the efficiency of tax preparation for Alpha Baker.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 5A:
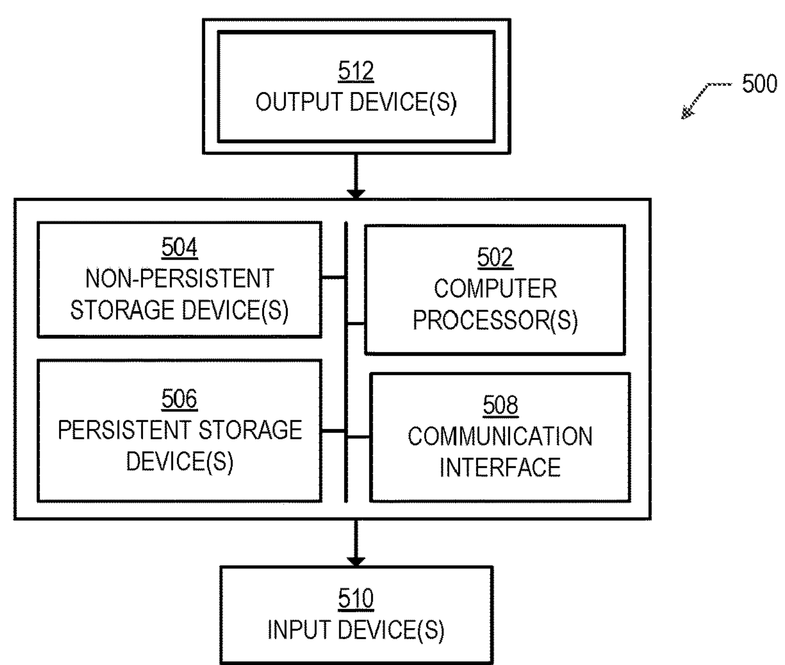
FIG. 5A and FIG. 5B show a computing system and network environment, in accordance with one or more embodiments.

For example, as shown in FIG. 5A, the computing system (500) may include one or more computer processor(s) (502), non-persistent storage device(s) (504), persistent storage device(s) (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) (502) may be one or more cores or micro-cores of a processor. The computer processor(s) (502) includes one or more processors. The computer processor(s) (502) may include a central processing unit (CPU), a graphics processing unit (GPU), a tensor processing units (TPU), combinations thereof, etc.

The input device(s) (510) may include a touchscreen, keyboard, mouse, microphone, touchpad, electronic pen, or any other type of input device. The input device(s) (510) may receive inputs from a user that are responsive to data and messages presented by the output device(s) (512). The inputs may include text input, audio input, video input, etc., which may be processed and transmitted by the computing system (500) in accordance with one or more embodiments. The communication interface (508) may include an integrated circuit for connecting the computing system (500) to a network (not shown) (e.g., a local area network (LAN), a wide area network (WAN) such as the Internet, mobile network, or any other type of network) or to another device, such as another computing device, and combinations thereof.

Further, the output device(s) (512) may include a display device, a printer, external storage, or any other output device. One or more of the output devices may be the same or different from the input device(s) (510). The input and output device(s) may be locally or remotely connected to the computer processor(s) (502). Many different types of computing systems exist, and the aforementioned input and output device(s) may take other forms. The output device(s) (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (502), is configured to perform one or more embodiments, which may include transmitting, receiving, presenting, and displaying data and messages described in the other figures of the disclosure.

Figure 5B:
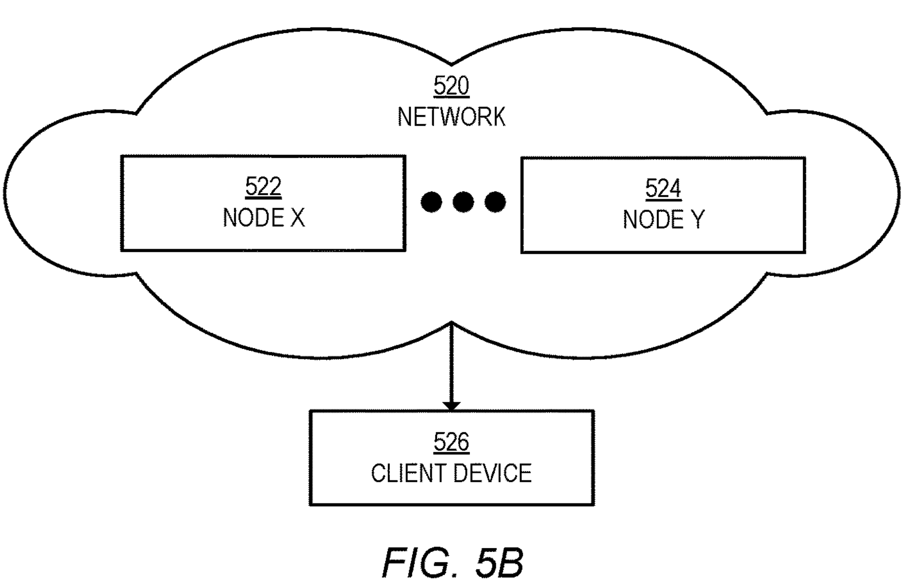

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522), node Y (524)) in the network (520) may be configured to provide services for a client device (526), including receiving requests and transmitting responses to the client device (526). For example, the nodes may be part of a cloud computing system. The client device (526) may be a computing system, such as the computing system shown in FIG. 5A. Further, the client device (526) may include or perform all or a portion of one or more embodiments.

The computing system of FIG. 5A may include functionality to present data (including raw data, processed data, and combinations hereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:

receiving a domain vector comprising a first data structure storing computer-readable data describing a first domain with which a subject interacts;

applying a multilabel classification model to the domain vector to generate a classification prediction comprising a classification vector, wherein:

the classification vector comprises a second data structure storing computer-readable data describing a likelihood that a second domain, which is different than the first domain, is related to the subject, and the classification prediction is based on the first domain;

applying an uplift model to the classification vector to generate an uplift value, wherein the uplift value represents a probability that the subject is positively associated with the second domain;

applying a vectorization algorithm to the subject, the second domain, and the uplift value to generate an uplift vector comprising a third data structure storing computer-readable data describing a triplet of the subject, the second domain, and the uplift value; and returning the uplift vector.

2. The method of claim 1, further comprising:

applying a generative model to a combination of the uplift vector and a description of the second domain to generate a message; and transmitting, via a communication interface, the message.

3. The method of claim 1, further comprising:

applying a generative model to a combination of the uplift vector, a user profile, and a description of the second domain to generate a message; and transmitting, via a communication interface, the message.

4. The method of claim 1, further comprising:

applying a prompt generator to a combination of the uplift vector and a description of the second domain to generate a prompt;

applying a large language model to the prompt to generate a message; and transmitting, via a communication interface, the message.

5. The method of claim 1, further comprising:

applying a prioritization controller to the classification vector to generate a prioritized classification vector, wherein applying the uplift model to the classification vector comprises applying the uplift model to the prioritized classification vector.

6. The method of claim 1, further comprising:

training an untrained multilabel classification model by applying, iteratively until convergence, the untrained multilabel classification model to a plurality of known multi-domain vectors, wherein:

each of the plurality of known multi-domain vectors store computer readable data that describe a plurality of subjects, other than the subject, which interact with both the first domain and the second domain, and training generates the multilabel classification model.

7. The method of claim 1, further comprising:

training an untrained uplift model by applying, iteratively until convergence, the untrained uplift model to a plurality of reaction histories of a plurality of users to a plurality of past messages, wherein training generates the uplift model.

8. The method of claim 1, further comprising:

training an untrained generative model by applying, iteratively until convergence, the untrained generative model to a combination of:

a plurality of descriptions of a plurality of examples of the second domain, and a plurality of past messages related to the second domain, wherein training generates a generative model programmed to output a message when the generative model is applied a combination of the uplift vector and a description of the second domain.

9. The method of claim 1, further comprising:

applying a generative model to a combination of the uplift vector and a description of the second domain to generate a message;

transmitting, via a communication interface, the message;

receiving a feedback regarding a behavior of first subject in response to the message; and retraining, iteratively until convergence, at least one of the multilabel classification model and the uplift model using the feedback.

10. A method comprising:

receiving a plurality of known multi-domain vectors storing computer readable data that describe a plurality of subjects, wherein:

each of the plurality of subjects interact with both a first domain and a second domain among a plurality of second domains, and labels for the plurality of subjects, each comprising a sub-vector identifying at least one corresponding second domain of the plurality of second domains with which a corresponding subject in the plurality of subjects interacted, training an untrained multilabel classification model by applying, iteratively until convergence, the untrained multilabel classification model to the plurality of known multi-domain vectors, wherein training generates a multilabel classification model;

receiving a domain vector comprising a first data structure storing computer-readable data describing the first domain with which a test subject interacts, wherein:

the test subject is different than the plurality of subjects, and the test subject fails to interact with the second domain;

applying the multilabel classification model to the domain vector to generate a classification prediction comprising a classification vector, wherein the classification vector comprises a second data structure storing computer-readable data describing a likelihood that the second domain is related to the subject, and applying an uplift model to the classification vector to generate an uplift value, wherein the uplift value represents a probability that the subject is positively associated with the second domain;

applying a vectorization algorithm to the subject, the second domain, and the uplift value to generate an uplift vector comprising a third data structure storing computer-readable data describing a triplet of the subject, the second domain, and the uplift value; and returning the uplift vector.

11. The method of claim 10, further comprising:

training an untrained uplift model by applying, iteratively until convergence, the untrained uplift model to a plurality of reaction histories of the plurality of subjects to a plurality of past messages, wherein training generates the uplift model.

12. The method of claim 10, further comprising:

training an untrained generative model by applying, iteratively until convergence, the untrained generative model to a combination of:

a plurality of descriptions of a plurality of examples of the second domain, and a plurality of past messages related to the second domain, wherein training generates a generative model programmed to output a message when the generative model is applied a combination of the uplift vector and a description of the second domain.

13. The method of claim 10, further comprising:
applying a generative model to a combination of the uplift vector, a user profile, and a description of the second domain to generate a message; and
transmitting, via a communication interface, the message.

14. A system comprising:
a computer processor;
a data repository in communication with the computer processor, the data repository storing:
a domain vector comprising a first data structure storing computer-readable data describing a first domain with which a subject interacts,
a classification prediction comprising a classification vector, wherein the classification vector comprises a second data structure storing computer-readable data describing a likelihood that a second domain, which is different than the first domain, is related to the subject,
an uplift value representing a probability that the subject is positively associated with the second domain, and
an uplift vector comprising a third data structure storing computer-readable data describing a triplet of the subject, the second domain, and the uplift value;
a multilabel classification model which, when applied the processor to the domain vector, generates the classification prediction;
an uplift model which, when applied by the processor to the classification vector, generates the uplift value;
a vectorization algorithm which, when applied by the processor to the subject, the second domain, and the uplift value, generates the uplift vector; and
a server controller programmed, when executed by the processor, to:
receive the domain vector,
coordinate applications of the multilabel classification model, the uplift model, and the vectorization algorithm, and
return the uplift vector.

15. The system of claim 14, further comprising:
a generative model programmed, when applied by the processor to a combination of the uplift vector, a user profile, and a description of the second domain, to generate a message; and
a communication interface which, when executed by the processor, transmits the message via a network.

16. The system of claim 14, further comprising:
a prompt generator programmed, when applied by the processor to a combination of the uplift vector and a description of the second domain, to generate a prompt;
a large language model programmed, when applied by the processor to the prompt, generates a message; and
a communication interface which, when executed by the processor, transmits the message via a network.

17. The system of claim 14, further comprising:
a prioritization controller programmed, when applied by the processor to the classification vector, to generate a prioritized classification vector,
wherein application of the uplift model to the classification vector comprises application of the uplift model to the prioritized classification vector.

18. The system of claim 14, further comprising:
a training controller programmed, when executed by the processor to train an untrained multilabel classification model by applying, iteratively until convergence, the untrained multilabel classification model to a plurality of known multi-domain vectors, wherein:
each of the plurality of known multi-domain vectors store computer readable data that describe a plurality of subjects, other than the subject, which interact with both the first domain and the second domain, and
training generates the multilabel classification model.

19. The system of claim 14, further comprising:
a training controller programmed, when executed by the processor, to train an untrained uplift model by applying, iteratively until convergence, the untrained uplift model to a plurality of reaction histories of a plurality of users to a plurality of past messages,
wherein training generates the uplift model.

20. The system of claim 14, further comprising:
a training controller programmed, when executed by the processor, to train an untrained generative model by applying, iteratively until convergence, the untrained generative model to a combination of:
a plurality of descriptions of a plurality of examples of the second domain, and
a plurality of past messages related to the second domain,
wherein training generates a generative model programmed to output a message when the generative model is applied a combination of the uplift vector and a description of the second domain.

* * * * *